Jan. 7, 1936.   J. B. WATSON   2,026,662
LUBRICATING SYSTEM
Original Filed May 20, 1929

Inventor
James B. Watson
By Blackmore, Spencer & Flint
Attorneys

Patented Jan. 7, 1936

2,026,662

UNITED STATES PATENT OFFICE 2,026,662

LUBRICATING SYSTEM

James B. Watson, Detroit, Mich., assignor, by mesne assignments, to General Motors Corporation, Detroit, Mich., a corporation of Delaware Application May 20, 1929, Serial No. 364,472
Renewed November 15, 1934

19 Claims. (Cl. 184—6)

Known lubricating systems being inadequate under starting conditions, and wasteful under subsequent continuous-running conditions, it is an object of this invention to provide an internal combustion engine, or the like, with both a pressure lubricating system, for use in normal running, and means for an initial splash lubrication of interior parts during a warming-up period,—pressure-responsive and/or manually manipulable means being preferably provided so as to effect a lowering of movable troughs or a movable pan upon the attainment of a predetermined pressure within certain oil conduits included in said pressure system.

The mentioned movable pan may be so pivoted as to be initially supported favorably to splash lubrication, but thereafter conditionally emptied into a stationary oil pan therebelow; and the latter may be included in or connected with an oil conditioning and/or oil circulating system of an appropriate type,—for pressure operation after the initial or warming-up period of splash lubrication. During the normal running period of pressure lubrication, the inner pan may be automatically lowered by oil pressure,—to be automatically raised, when the oil pressure drops, in readiness for use during a subsequent period of splash lubrication; and a spring employed to raise the oil pan may incidentally serve to advance oil to bearings from a variable-volume chamber for a limited time after the engine is stopped.

Other objects of this invention, including the use of a preferred "cooling" or thermal-control system, may best be appreciated from the following description of an illustrative embodiment thereof, taken in connection with the appended claims and the accompanying drawing.

Figure 1:
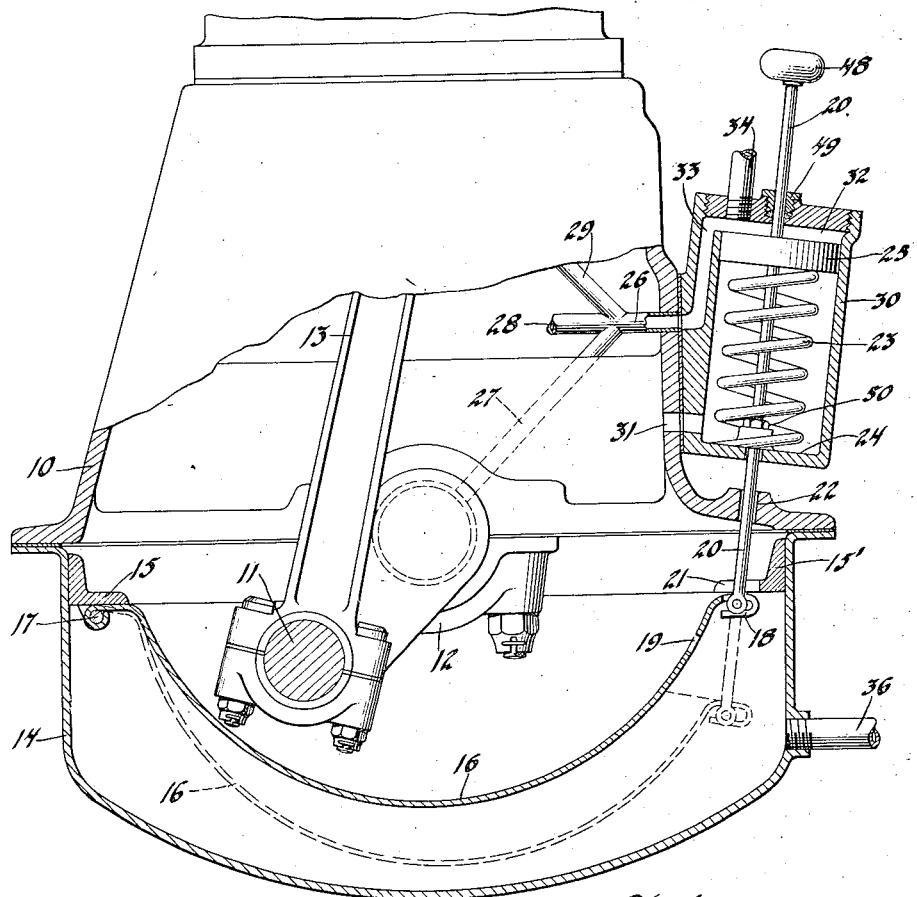
Figure 1 is an end elevation of an engine, partly in vertical section through a crankcase and associated parts, illustrating the present invention.

Referring first to Figure 1, a crankcase 10 (within which a crankshaft 11, provided with bearings 12, may be rotated by pistons connected with any suitable number of connecting-rods 13) is shown as supporting an outer and fixed oil pan 14,—there being no necessary novelty in the foregoing parts; and the fixed pan 14 is shown as interiorly provided with longitudinally extending side flanges 15, 15', to or below one of which a movable set of troughs or splash pan 16 may be pivotally or otherwise supported, as at 17. The flanges 15, 15' may be so formed as to permit at least a partial drainage into the pan 16; but, by overflow or otherwise, a part of the splashed oil should be permitted to drain into pan 14. The edge 18 of the splash pan (which may be provided with an overflow and refilling opening 19) is shown as pivotally connected to a rod or link 20, which may be freely slidable through a notch 21 in the flange 15' and/or through an opening 22 in the crankcase 10; and, in order conditionally or initially to retain the pan 16 in its upper or full-line position, to effect splash lubrication of the shaft 11 and parts thereabove, means such as a compression spring 23, interposed between a movable or fixed lower stop 24 and a handle or head 25, may surmount or surround the rod or link 20.

In order to provide for automatic depression of the pan 16, to discontinue splash lubrication whenever a desired pressure shall have been built up within a pressure lubricating system which may include a delivery pipe or conduit 26 (and any desired branches 27, 28, 29, respectively, leading toward a bearing 12 and toward any desired additional surfaces requiring lubrication), the head 25 may be adapted to fit and function as a piston within a cylinder 30,—the latter serving as a housing for the spring 23. A lower outlet or drain hole is shown at 31,—through which air and/or oil may escape upon leakage past, or upon depression of, the head or piston 25.

A variable-volume chamber 32, above the head or piston 25, being connected by a passage 33 with the delivery conduit 26, it will be understood that oil entering this space 32 (as by way of a pipe or conduit 34, from any desired oil feeding and/or conditioning unit or units) may begin, even during a warming-up period of splash lubricating, to advance through said delivery conduit to the respective bearings; after which, and as soon as the pressure in said space exceeds the power of the spring 23, or its equivalent, depression of the head or piston 25 may so depress the pan 16 as to empty the same, discontinuing splash lubrication.

Thus splash lubrication is provided for until such time as any pump which may be connected with an outlet pipe or conduit 36 from the pan 14 builds up a predetermined pressure within the space 32 and throughout the pressure lubricating system communicating therewith; normal lubrication may then continue throughout a pressure-lubricating system of any desired type, the depressed inner pan being incidentally refilled in readiness for subsequent use and automatically elevated whenever the pressure drops.

Figure 2:
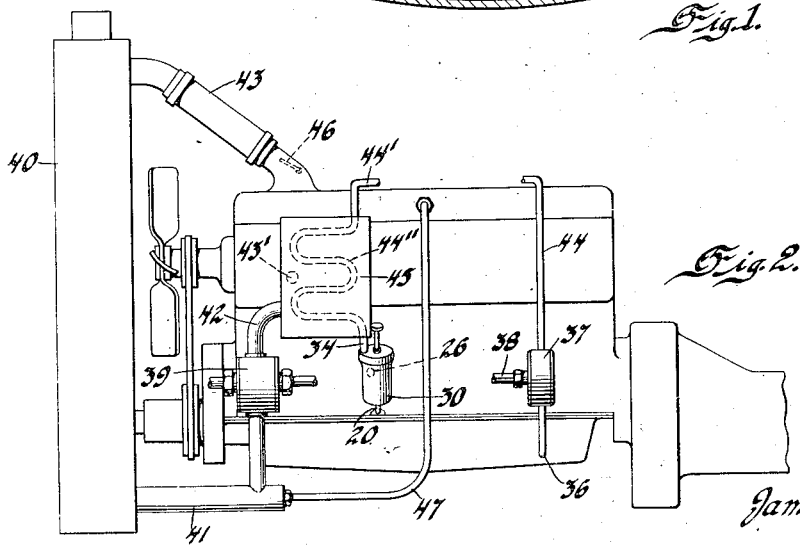
Figure 2 is a diagrammatic side elevational view.

Obviously, such a failure of, or fall in, pressure as to permit the piston 25 to remain in or to rise to its illustrated position automatically maintains or restores splash lubrication, regardless of the specific character of any pump or pumps with which pan outlet 36 may be connected, or the specific character of any filters and/or "coolers" and/or other devices that may be interposed in pipes such as 26 and/or 34 or elsewhere; but an outlet pipe 36 from the oil pan 14 is shown in Figure 2 as communicating with the intake side of an oil pump 37; and this pump may be driven by any suitable means, such as a shaft 38 by which a water pump 39 may also be driven,—the latter pump being shown as interposed in a cooling water circuit which includes a radiator 40 and pipes 41, 42, leading into an oil "cooler", and 43, leading to the radiator 40 from the engine block. Onto this the "cooler" may be so directly secured as to admit the cooling water leaving by its exit opening 43' into a "coring" opening opposite thereto in the engine block. To establish and hold a desired temperature, a part or all of the oil delivered by the pump 37, or its equivalent, may normally advance (as by way of pipes 44 and/or 44') into a "cooler" or thermal-control organization or unit 45 of any preferred character; and an outlet from a unit of the latter sort (which may have a heat-exchange conduit 44'', for oil advanced by pump 37, extending therethrough) may be in direct or indirect communication with some mentioned part (as, the pipe 34) of the pressure lubricating system. There may be provided, as at 46 in pipe 43, a thermostatic valve which tends to close or to produce a "choke" effect at low temperatures, and also a short-circuiting by-pass 47, whereby hot water from the engine block may be fed back through pump 39 into unit 45. The movable pan 16 may even be used independently of the described pressure and thermal systems and either with or without a manual handle 48 on rod 20,—shown as extending through glands 49, 50; and atmospheric or slightly reduced pressures may be maintained in case 10 and pan 14 by the admission of air through opening 22 or through a usual breather opening, and/or any preferred means may supplement the action of a pump or pumps 37 in the withdrawal of oil with or without air containing undesired vapors.

Assuming the outer pan 14, or its equivalent, to be suitable to receive (say) six quarts of oil, the movable pan 16, may be adapted to hold, as a slightly elevated pool of oil within reach of cranks 11 for a splash effect, about three quarts before overflowing through opening or openings 19; agitation and exposure quickly warm the oil; and the overflowing oil as thus conditioned or as subsequently returned before or after the pan 16 is lowered, may be carried by any suitable pump 37 into any preferred pressure system. When the spring 23 becomes so compressed as substantially to empty the pan 16, the system may function as if the parts last referred to were not provided, except as said spring may then still serve to advance oil from the variable-volume chamber 32 toward the engine bearings,—even after the engine, with its pump 37, is stopped. The pan 16 is then gradually lifted and refilled, for subsequent use as described.

The power of the spring 23 must naturally depend upon the intended pressure of normal operation and/or the intended overlapping period of splash operation; but even a low pressure, properly controlled, is useful; and it will be seen that the described system, although assuring ample lubrication during the critical period of starting, may be so adjusted as to effect important economies in total oil consumption, as compared with common systems of exclusive pressure lubrication, splash lubrication, gravity lubrication or known combinations thereof.

Although the foregoing description has included details of but one complete embodiment of the present invention, it should be understood not only that various features thereof might be independently employed and that the external positioning of mentioned elements is optional, but that numerous modifications, additional to those suggested herein, might easily be devised,—all without involving the slightest departure from the spirit and scope of said invention.

I claim:

1. In an engine: means, including a movable pan, for initially splash-lubricating relatively moving parts; means for feeding a lubricant under pressure to said parts; and means, responsive to a predetermined pressure, for varying the position of said splash pan.

2. In an engine: means including a movable pan, for initially splash lubricating relatively moving parts; means for feeding a lubricant under pressure to said parts; and means, responsive to a predetermined pressure, for varying the position of said splash pan,—said pan being pivotally supported.

3. In an engine: means, including a movable splash pan within an additional pan, for lubricating relatively moving parts; means for feeding a lubricant under pressure to said parts; and means, responsive to a predetermined pressure, for varying the position of said splash pan,—said pan being so disposed within said additional pan as to receive splash drainage from said parts 4. In an engine: means, including a movable pan, for splash lubricating relatively moving parts; means for feeding a lubricant under pressure to said parts; and means, responsive to a predetermined pressure, for varying the position of said splash pan,—said pressure-responsive means comprising a piston and a cylinder, and means yieldingly supporting said piston against said pressure.

5. In an engine: a pressure lubricating system; a movable pan for splash lubrication; and means associated with the pressure lubricating system for moving said pan to such a position as to render the splash system ineffective upon the attainment of predetermined pressure conditions in the pressure lubricating system.

6. In an engine: a movable pan for splash lubrication; a pressure lubricating system; and means for lowering said pan, to diminish splash lubrication, upon the attainment of a predetermined pressure within said system,—a fixed pan being secured below said movable pan, to receive lubricant therefrom.

7. In an engine: a movable pan for splash lubrication; a pressure lubricating system; and means for lowering said pan, to discontinue splash lubrication, upon the attainment of a predetermined pressure within said system,—a fixed pan being secured below said movable pan, and one of said pans being provided with an outlet to a pump which delivers into said system.

8. In an engine: a movable pan for splash lubrication; a pressure lubricating system; and means for so moving said pan as to discontinue splash lubrication upon the attainment of a predetermined pressure within said system,—a fixed pan being secured below said movable pan, and one of said pans being provided with an outlet to a pump which delivers into said system through a cylinder which is comprised in said pan moving means.

9. In an engine: moving interior parts; means assuring an initial splash lubrication thereof; a system for subsequent pressure lubrication thereof; a variable-volume chamber for receiving lubricant during such pressure lubrication; and means for gradually expelling lubricant from said chamber into said pressure system after the stopping of said engine.

10. In an engine: moving interior parts; means assuring an initial splash lubrication thereof; a system for subsequent pressure lubrication thereof; a variable-volume chamber for receiving lubricant during such pressure lubrication; and means for gradually expelling lubricant from said chamber into said pressure system after the stopping of said engine,—said last-mentioned means including a compression spring and a piston.

11. In an engine: moving interior parts; means assuring an initial splash lubrication thereof; a system for subsequent pressure lubrication thereof; a variable-volume chamber for receiving lubricant during such pressure lubrication; and means for gradually expelling lubricant from said chamber into said pressure system after the stopping of said engine,—said last-mentioned means including a compression spring and a piston connected with a movable pan comprised in said means for splash lubrication.

12. In an engine: moving interior parts; means assuring an initial splash lubrication thereof; a system for subsequent pressure lubrication thereof; a variable-volume chamber for receiving lubricant during such pressure lubrication; means then discontinuing splash lubrication; and means for restoring said first-mentioned means upon the discontinuance of pressure lubrication.

13. In mechanism of the class described, surfaces to which lubricant is adapted to be supplied, a container from which lubricant may be splashed onto the surfaces, means by which lubricant may be supplied to the surfaces under pressure, and means by which the lubricant in the container may be removed therefrom so as to render the splash system ineffective.

14. In mechanism of the class described, surfaces to which lubricant is adapted to be supplied, a container from which lubricant may be splashed onto the surfaces, means by which lubricant may be supplied to the surfaces under pressure, and means for moving the container to a position in which the splash system is ineffective.

15. In mechanism of the class described, surfaces to which lubricant is adapted to be supplied, a container from which lubricant may be drawn and supplied to the surfaces under pressure, a container from which lubricant may be splashed onto the surfaces and means to move the last mentioned container so as to render the splash system ineffective, and to discharge the lubricant therein into the first mentioned container.

16. In mechanism of the class described, surfaces to which lubricant is adapted to be supplied, a container from which lubricant may be splashed onto the surfaces, a receptacle disposed below the container, and means by which lubricant in the container may be removed therefrom and transferred to the receptacle so as to render the splash system ineffective upon the attainment of predetermined lubricating conditions.

17. In mechanism of the class described, means for supplying lubricant to surfaces of the mechanism, a passage for conducting lubricant to surfaces of the mechanism, and a variable volume chamber to which lubricant is supplied during operation of the mentioned means and from which lubricant is discharged into the mentioned passage by reason of a reduction in the volume of the chamber when the mechanism ceases to operate.

18. In mechanism of the class described, a passage for conducting lubricant to surfaces of the mechanism, a variable volume chamber which communicates with the passage, means for advancing lubricant under pressure through the passage to the mentioned surfaces and into the chamber and increasing the volume of the chamber during operation of the mechanism, and means for reducing the volume of the chamber and thereby advancing lubricant therefrom to the mentioned surfaces after the mechanism ceases to operate.

19. In mechanism of the class described, a receptacle from which lubricant may be splashed onto surfaces of the mechanism, a passage for conducting lubricant to surfaces of the mechanism, means for advancing lubricant under pressure through the passage to surfaces of the mechanism, a chamber with a movable wall to which lubricant is supplied during operation of the mentioned means, means by which lubricant in the receptacle is removed therefrom so as to render the splash system ineffective upon predetermined movement in one direction of the movable wall of the chamber, and means to move the movable wall of the chamber in the other direction to advance lubricant from the chamber to the mentioned surfaces when the mechanism ceases to operate.

JAMES B. WATSON.